(No Model.)
C. H. VORHES.
VEHICLE BODY.
No. 511,825. Patented Jan. 2, 1894.
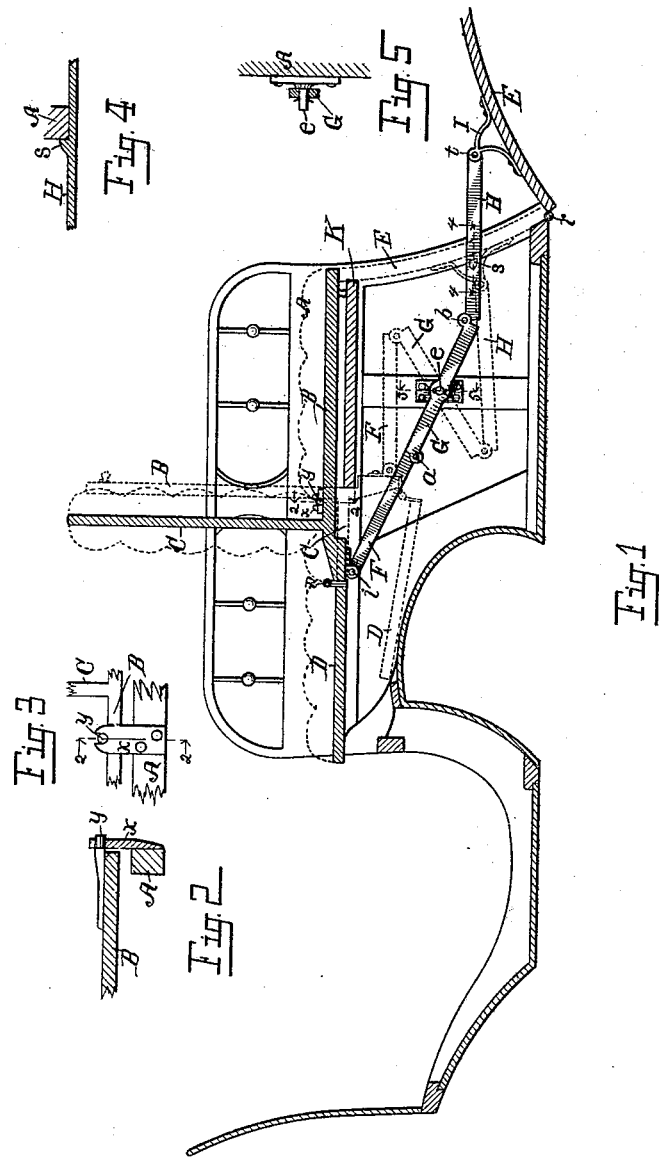
Witnesses:
Walter S. Wood
Cora Westbrook
Inventor.
Charles H. Vorhes
By Fred L. Chappell
Att'y.
THE NATIONAL LITHOGRAPHING COMPANY,
WASHINGTON, D. C.

UNITED STATES PATENT OFFICE.

CHARLES H. VORHES, OF KALAMAZOO, MICHIGAN, ASSIGNOR TO THE MICHIGAN BUGGY COMPANY, OF SAME PLACE.

VEHICLE-BODY.

SPECIFICATION forming part of Letters Patent No. 511,825, dated January 2, 1894.

Application filed April 7, 1893. Serial No. 469,397. (No model.)

*To all whom it may concern:*

Be it known that I, CHARLES H. VORHES, a citizen of the United States, residing at the city of Kalamazoo, in the county of Kalamazoo and State of Michigan, have invented certain new and useful Improvements in Vehicle-Bodies, of which the following is a specification.

My invention relates to improvements in vehicle bodies and more particularly to the arrangement of a folding seat in combination with the body and the means of controlling the seat.

The objects of my invention are first to provide a vehicle body and folding seat so arranged that it can be readily changed from a single seated to a two seated vehicle. The seats being back to back or dosados when the two are used; second, to provide a vehicle that can be changed from a dosados to a single rig so that it will not have the appearance of being a two seated vehicle with but one seat when in the single form; third, to provide a system of levers and connections between the seat and tail board so that raising and lowering the tail board will operate the seat and lock it in position.

The device by which I accomplish these results are shown in the accompanying drawings, in which—

Figure 1, is a sectional view through the length of a vehicle body embodying my invention. Fig. 2, is a sectional view on line 2—2 of Figs. 1, and 3, showing detail of pivoting the seat. Fig. 3, is a detail view of the pivot on one side of the body on which the seat revolves and adjacent parts looking from the farther side. Fig. 4, is a sectional view on line 4—4 of Fig. 1, showing the stop. Fig. 5, is a sectional view on line 5—5 of Fig. 1, showing the pivot of the lever and adjacent parts.

Similar letters of reference refer to similar parts throughout the several views.

A, is the body of the vehicle to which the seats and their operating mechanism are attached. The seats are shown both in position for use in the drawings. The dotted lines show the position of the parts when but one seat is desired.

In the drawings B, is the back seat and D, is the front seat. C, is the back between the two and is cushioned on both sides. Pivots $y$ on the back seat B, at a little distance from the back C, fit into bearings on the lugs $x$ which are secured to each side of the body A. The entire seat or seats swing on the pivots $y$. Both sides of the body are the same. The front seat D, is hinged at a little distance from the back C, by the hinges $n$ the cushion being divided at that point and the joints of the hinges $n$ projecting up toward the top of the cushions to admit of their being folded without compressing the cushions.

The tail gate E, is hinged at $r$ and has a bracket I, which is pivoted at $t$ to the connecting bar H, which connects at the farther end by pivot $b$ to the lever G. The lever G is pivoted at $e$ to the body A, under the rear seat B. The farther end of the lever G is connected by a joint $a$, similar to a rule joint, to the connecting bar F, which connects by the pivot $i$ to the front seat D, back of the hinges $n$.

It will be noticed that in the position shown the rule joint $a$ is in line with the pivots $i$ and $e$ which locks it in position and makes it impossible to move the seat without applying upward pressure between pivots $i$ and $e$ or downward pressure at $b$.

The pivots $t$, $b$, and $e$ are not in the same line which makes it possible to operate the lever G by raising and lowering the tail board E, which will of course operate the seat. Stops $s$ on the bars H, prevent the pivots $t$, $b$ and $e$ coming into the same line.

When the tail board E is shut up to the end, the various parts swing to the positions indicated by the dotted lines. The front seat D folds and drops down, the back C, takes the place of the front seat D, and the back seat B, rises up and forms the back of the single seat. The under side of the back seat B, and the board K, under it and the under side of the tail board E, are all polished surfaces and present a finished appearance like a solid box behind.

I am aware that many variations of connecting the tail board by a locking joint to the folding seat will readily suggest themselves from my invention and I do not desire to be confined to the precise structure here shown.

What I claim as my invention, and desire to secure by Letters Patent, is—

1. A vehicle body having a hinged tail gate E in combination with a rear seat B, a forward seat D, containing the hinge $n$, the back C, between the seats, the pivots $y$, the seats being pivotally connected to the tail gate E by connecting bars H, and F, having jointed connections to opposite ends of lever G, which is pivoted at $e$ to the body, substantially as described for the purpose specified.

2. A vehicle body with a rear facing seat B, and a front facing seat D, having a vertical back C between, and integral therewith all combined and pivoted to the body in combination with a connecting bar which connects to a lever by a locking joint the lever being connected to a hinged tail gate for the purpose specified.

In witness whereof I have hereunto set my hand and seal in the presence of two witnesses.

CHARLES H. VORHES. [L. S.]

Witnesses:
 CORA WESTBROOK,
 CATHERINE SEVERENS.